May 8, 1962
R. L. KERR
3,033,225
COMBINATION LUBRICATOR AND ACTUATOR
Filed Nov. 24, 1958
4 Sheets-Sheet 1
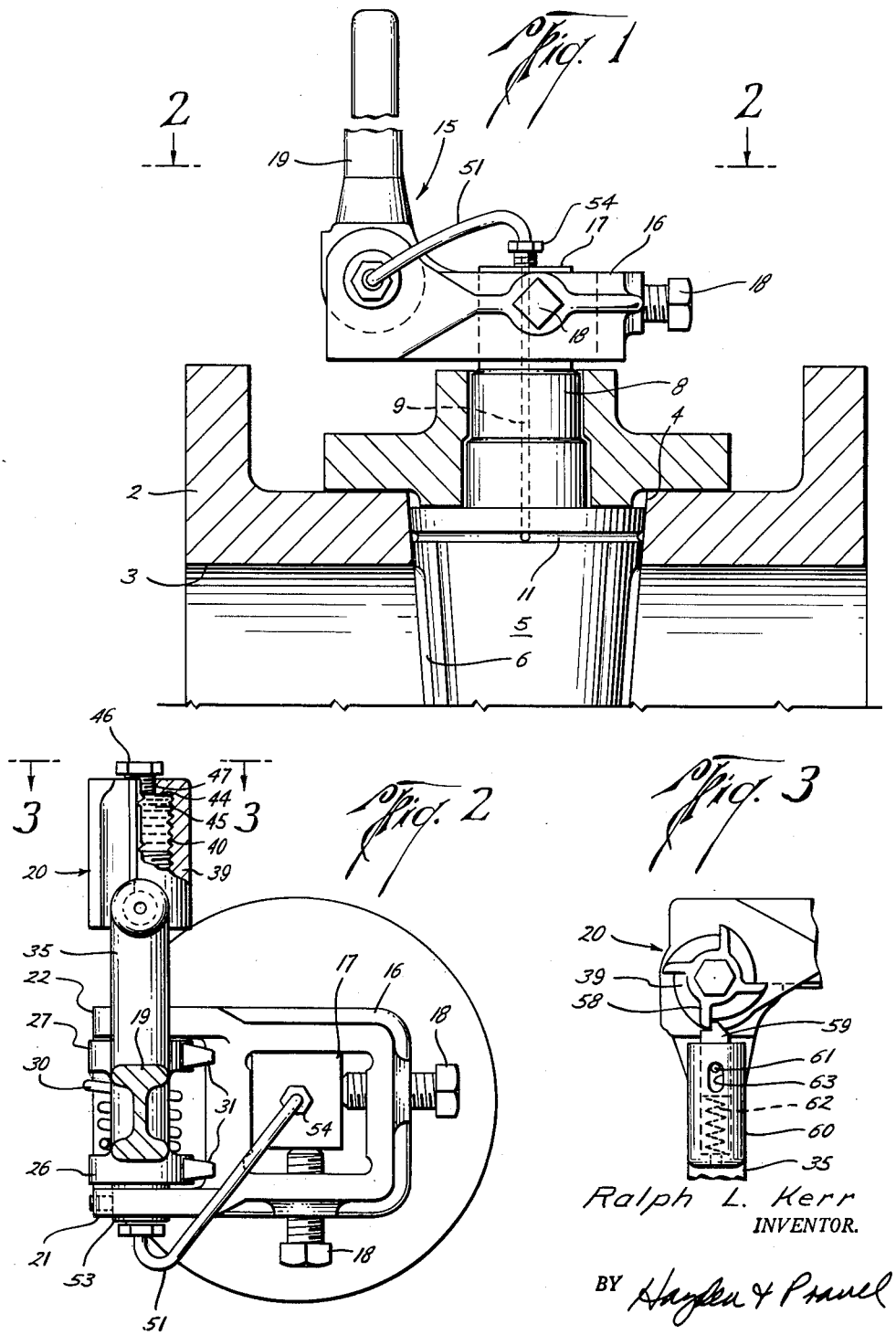
Ralph L. Kerr
INVENTOR.
BY Hayden & Pravel
ATTORNEYS

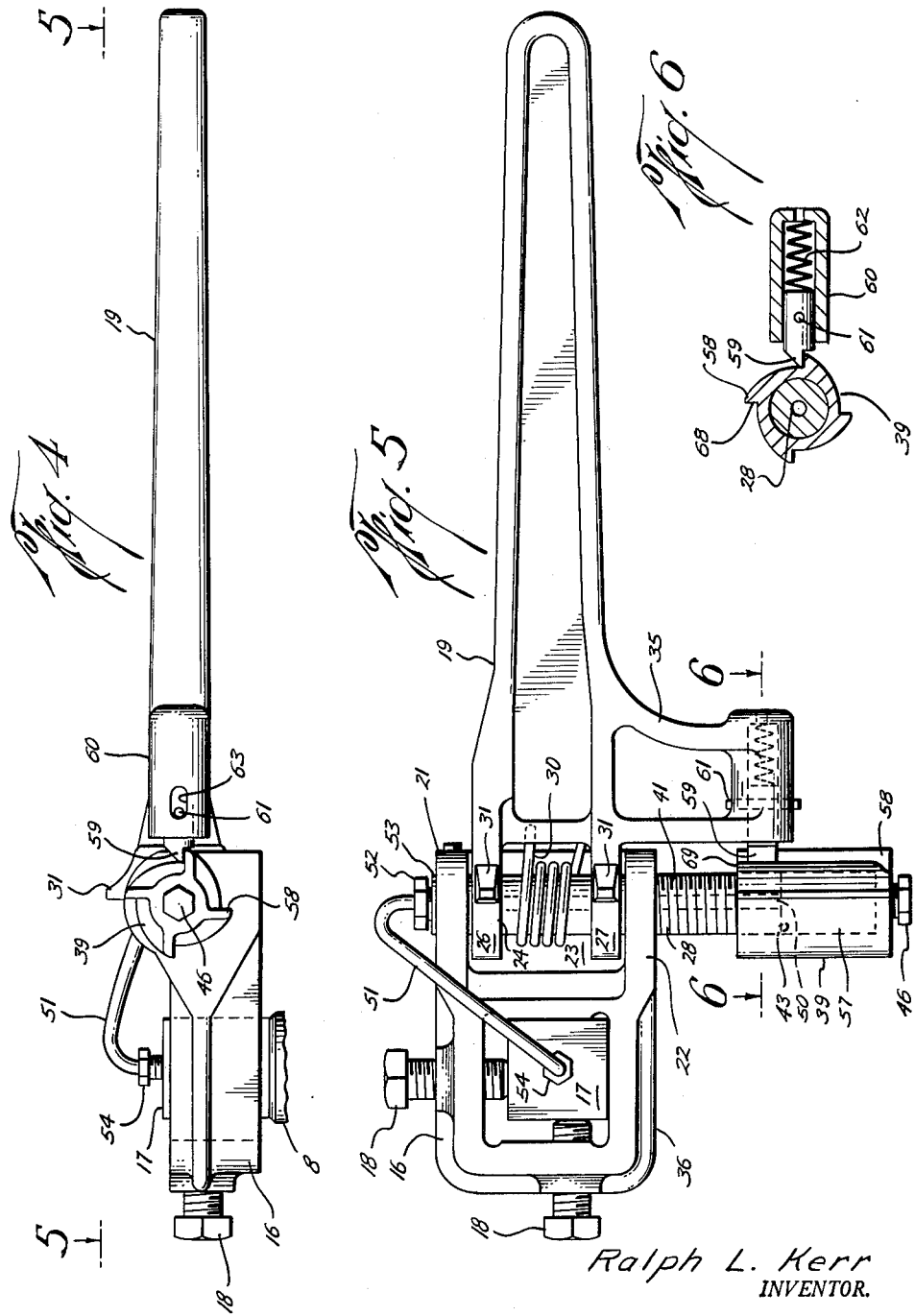

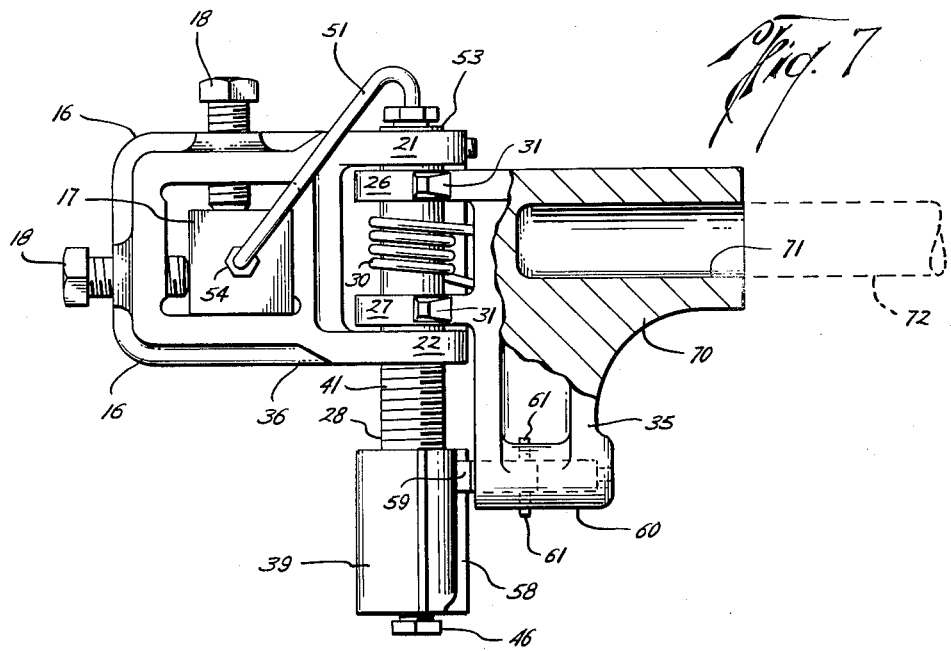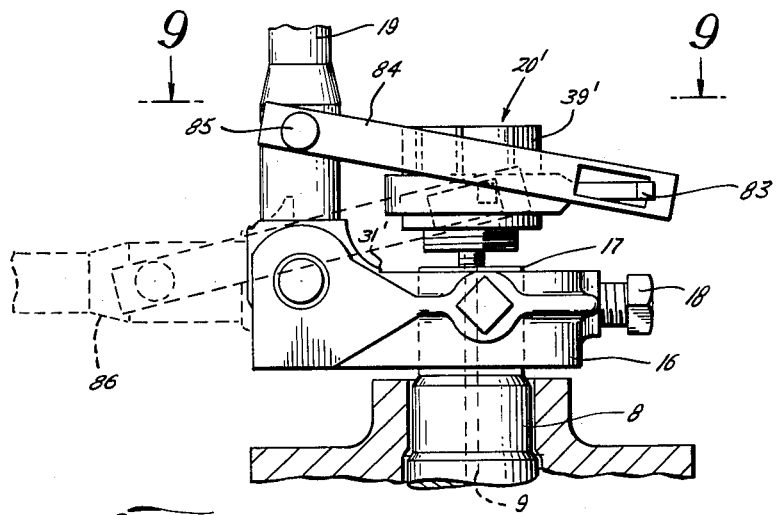

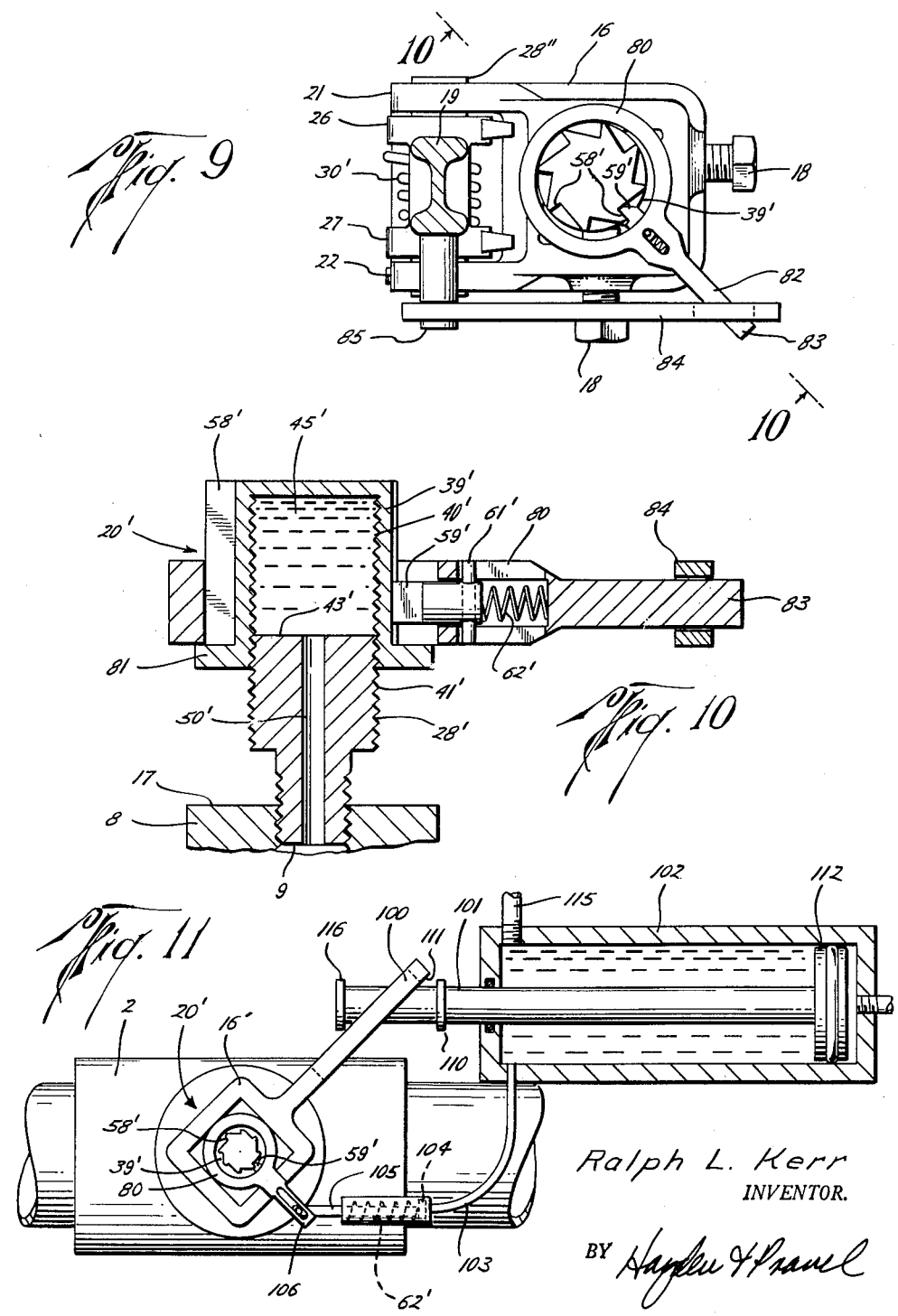

United States Patent Office 3,033,225
Patented May 8, 1962

3,033,225
COMBINATION LUBRICATOR AND ACTUATOR
Ralph L. Kerr, Box U, Columbus, Tex.
Filed Nov. 24, 1958, Ser. No. 775,837
8 Claims. (Cl. 137—246.13)

The present invention relates to a combination lubricator and actuator.

Plug valves and other types of devices function better when they are periodically lubricated. Certain forms of lubrication have been heretofore suggested for various devices, and particularly plug valves, but such lubrication systems are disadvantageous in that they must rely upon the human element of memory in order to be actuated. Therefore, in practice, it is not unusual for a plug valve to go over an extended period of time before the lubricating mechanism thereof is operated to force lubricant into the valve operating parts. This is extremely undesirable because insufficient lubrication of the valve may cause the plug to stick either in open or closed position, making it extremely difficult to operate. Also, if the valve has not been lubricated over an extended period of time, then the normal reaction is to operate the lubricating mechanism in a manner so that an excessive amount of lubricant is provided between the moving parts. This is as objectionable as insufficient lubrication because it permits lubricant to pass into the stream being conducted through the valve.

Another disadvantage with lubricating systems used on valves and other mechanisms requiring frequent lubrication during their operation is that there is no satisfactory means of insuring that the lubricant is provided to the valve or other device in a desired or correct sequence during opening or closing of the valve, or operation of the device upon which the lubricating mechanism is provided. For example, in a plug valve, it is desirable that the lubricant be provided between the moving parts each time prior to opening or closing of the valve. This initial charge of lubricant aids in properly moving the plug of the valve off its seat, whereupon the valve may be thereafter actuated for moving the plug to open or closed position, as desired.

The present invention overcomes the disadvantages of lubricating systems in various devices, such as, for example, plug valves, in that it provides an arrangement which always insures that the lubricant is discharged to the valve at the proper sequence of operation.

Another advantage of the present invention is that it discharges a uniform amount of lubricant between the moving parts of the valve each time it is operated, thereby aiding in overcoming the problem of either over-lubricating, or not providing enough lubricant to the moving parts of the valve.

Still a further object of the present invention is to provide a lubricating mechanism for a device, which mechanism is constructed and arranged so that the actuating part of the mechanism which operates the device cannot be manipulated until after the lubricating mechanism has been actuated.

Still a further object of the present invention is to provide a combination lubricator actuator for a device which includes means for actuating the device, and additional means for supplying a predetermined amount of lubricant to the device each time before it is actuated.

Still a further object of the present invention is to provide a combination lubricator actuator for a device such as a plug valve, wherein means are provided for operating the valve, and additional means associated therewith for lubricating the valve each time before it is operated, the lubricating mechanism being constructed and arranged so that it will lock the valve against further operation when all of the lubricant has been discharged from the lubricating mechanism.

Yet a further object of the present invention is to provide a relatively simple mechanism for operation of a valve or other device, which mechanism also includes a relatively simple lubricating mechanism which is positive in its function, and which lubricating mechanism is so coordinated with the operating mechanism that it will lock the operating mechanism against actuation of the device when all of the lubricant from the lubricating mechanism has been used.

Other objects and advantages of the present invention will become more readily apparent from a consideration of the following description and drawings wherein:

FIG. 1 is a side view of one form of the present invention showing it mounted on a plug valve;

FIG. 2 is a top view on the line 2—2 of FIG. 1 illustrating further details of the combination actuator-lubricator;

FIG. 3 is a view on the line 3—3 of FIG. 2 and illustrates the structure for forcing lubricant from the lubricant reservoir into the valve illustrated in FIG. 1 of the drawings;

FIG. 4 is a side view somewhat similar to FIG. 1, but rotated 180°, and illustrating the components of the present invention in a different relative position;

FIG. 5 is a view on the line 5—5 of FIG. 4 to more clearly illustrate the structural details of the components of the present invention;

FIG. 6 is a sectional view on the line 6—6 of FIG. 5 to show further structural details of the lubricating mechanism;

FIG. 7 is a view of an alternate form of the invention, and is somewhat similar to FIG. 5, except that the handle of the device of the invention is illustrated in dotted line in FIG. 7;

FIG. 8 is a side view of an alternate form of the invention showing a different arrangement of the lubricating mechanism;

FIG. 9 is a top view on the line 9—9 of FIG. 8 and illustrates in more detail the operative connection between the part of the device which operates the valve, and the lubricator part of the device;

FIG. 10 is an enlarged sectional view on the line 10—10 of FIG. 9 to further illustrate structural details of the form of the lubricating mechanism used with the invention illustrated in FIGS. 8 and 9; and FIG. 11 is a top plan view illustrating still another form of the invention.

It will be understood that the present invention is described in detail in its use and application on a plug valve; however, the invention has utility in any situation where it is desirable to lubricate a device each time before it is actuated. The description of the invention and its application to a plug valve is for purposes of illustration only.

In FIG. 1 a valve body is shown at 2 with a passage 3 therefor for conducting fluids or other materials through the body 2. The bore 4 extends laterally of the passage 3, the bore 4 being closed off by the plug 5 which is provided with the opening 6 therethrough, whereby flow of materials through the passage 3 in the body 2 may be regulated by rotating the plug 5 so that the opening 6 therethrough is either aligned or misaligned with regard to the passage 3.

Generally, this type of valve is provided with a stem 8 having a passage 9 therethrough, whereby lubricant may be conducted to suitable grooves as indicated at 11 on the surface of the plug 5 for lubrication of the plug 5 to inhibit sticking thereof during operation of the valve. The construction of such valve is well known, and it is believed unnecessary to give a detailed description thereof at this time. Heretofore, such valves have been lubricated by providing a piston-like member which is threadedly secured in the passage 9 so that rotation of the piston-like member forces lubricant down the passage 9 and into the grooves 11. As previously mentioned, this is extremely undesirable in that it does not insure that the proper amount of lubricant is conducted to the grooves 11, nor does such mechanism insure that the valve is properly lubricated each time it is used.

The invention illustrated generally by the numeral 15 is provided to overcome this and other disadvantages. As shown in FIG. 1, the lubricator-actuator device 15 is in the form of a wrench having a body 16 that is adapted to be secured to the top of the valve stem 17 by any suitable means such as the bolts 18 which may be threadedly secured through the body 16 as shown in FIGS. 1 and 2 to position it on the top 17 of the valve stem 8.

A handle 19 is provided for imparting rotation to the body 16 of the wrench, whereupon the valve stem 8 may be rotated to open or close the valve 2. The lubricator part of the device 15 is illustrated generally at 20 and is constructed and arranged so that before the handle 19 is in a position suitable for imparting rotation to the body 16, lubricant has been forced from the lubricator 20 to the passage 9 in the valve stem 8. This insures lubrication of the valve each time it is actuated, and further insures that the valve is lubricated prior to the time that it is actuated, as well as providing a uniform amount of lubricant to the valve.

The body 16 is provided with two spaced projections 21 and 22 which form an opening 23 for receiving the inner end 24 of the handle 19 as shown in FIG. 5 of the drawings. The handle 19 is provided at its inner end 24 with two projections 26 and 27 which have openings therethrough so that the elongated member 28 may be passed through mating openings (not shown) in each of the body projections 21 and 22, as well as each of the handle projections 26 and 27 to rotatably or pivotally mount the handle 19 relative to the body 16. Suitable spring means as illustrated at 30 in FIGS. 1–5 of the drawings are provided for normally maintaining the handle 19 at a right angle relationship relative to the body 16. This relationship is more clearly demonstrated in FIGS. 1 and 2 of the drawings. Stops 31 are provided on each of the handle projections 26 and 27 to support the handle in the upright position relative to the body 16 as shown in FIGS. 1 and 2 of the drawings.

From the above description, it can be appreciated that the handle 19 is normally retained in a position relative to the body 16 so that the handle 19 must be first of all, rotated or pivoted downwardly to align with the body 16 as illustrated in FIG. 4 of the drawings in order to impart rotation to the valve stem 8 to open or close the valve.

The actuator 20 is constructed and arranged so that lubricant is forced to the valve stem 8 as the handle 19 is moved from its normally vertical position to a substantially horizontal position to operate the valve. Thus, it can be appreciated that the lubricator 20 always functions to initially provide a charge of lubricant to the valve before the valve is actuated to open or close it.

In FIG. 5 it will be noted that a projection 35 extends from the side of the handle and as can be seen in FIG. 2, this projection extends in the same direction and is aligned with the elongated member 28 which supports the handle 19 pivotally on the body 16. The elongated member 28 extends outwardly from the side 36 of the body 16 and is closed off by means of the closure 39, which closure is provided with threads 40 on its inner periphery that engage the threads 41 on the member 28 so that the closure 39 is rotatably and movably supported relative to the member 28. The member 28 is held stationary by reason of its fit in the openings in the body extensions 21 and 22.

As illustrated at dotted line 43 in FIG. 5, the end of the member 28 terminates short of the inner end 44 of the closure member 39 so that the closure member 39 and the end 43 of the member 28 thereby define a lubricant reservoir 45. As represented by dotted line at 50 in FIG. 5, the elongated member 28 is provided with a passage which extends therethrough and communicates with the passage 9 in the valve stem 8 by means of the tube 51 which is connected at 52 to the end 53 of the member 28, and is also connected by suitable means such as a lubricant fitting 54 in the top 17 of the valve stem 8.

The outer periphery or surface 57 of the closure member 39 is provided with circumferentially spaced projections 58 which extend longitudinally thereof from end to end. These projections 58 form a ratchet wheel which is adapted to engage with the pawl 59 carried by the side projection 35 of handle 19.

As more clearly illustrated in FIG. 3, the pawl 59 is mounted in the hollow portion 60 of the side extension 35 of handle 19 by means of the pin 61 which is adapted to be inserted in the pawl 59 after the pawl 59 and the spring 62 have been inserted in the hollow portion 60. The pin 61 not only serves to retain the pawl 59 in the hollow portion 60, but it also aids in guiding up and down movement of the pawl 59 relative to the hollow portion 60 by reason of the interfit of the pin 61 in the groove 63 formed in the hollow portion 60 as shown in FIG. 3 of the drawings. Therefore, the spring 62 continually urges the pawl 59 downwardly into engagement with the ratchet wheel formed by the projections 58 on the outer surface of member 39. As shown in the drawings, there are four projections 58 which are suitably spaced on the member 39 so that when the handle 19 is moved to its normal position as shown in FIG. 1 and FIG. 2 of the drawings, the pawl 59 will engage one of the projections 58 as shown in FIG. 3 of the drawings.

A plug 46 closes off the opening 47 in the end of the member 39 and provides a means whereby a grease fitting can be put in the opening 47 and lubricant supplied to the reservoir 45 from time to time, as required. Thereafter the plug can be reinserted in position in the member 39 during normal use and operation of the device.

In operation of the modification of the invention illustrated in FIGS. 1–6 inclusive, the spring means 30 normally retains the handle 19 in a predetermined position relative to the body 16. Any suitable angular relation may be used, depending upon the application of the invention, and as illustrated in the present invention it is desirable that a right angular relation be maintained. When in this position the pawl 59 is engaged with one of the projections 58 on the closure 39, and as the handle 19 is rotated from the position shown in FIG. 1 to the position illustrated in FIGS. 4 and 5 where it is aligned with the body 16, rotation of the closure member 39 is effected by engagement of the pawl 59 with one of the projections 58. This causes the closure member 39 to move along the threads 41 on the elongated member 28 and reduces the volume of the reservoir 45, and thereby forces lubricant through the passage 50 in the elongated member 28 and through the tubular member 51 to the passage 9 in the valve stem 8. After the valve has been actuated by moving the handle 19 in substantially a horizontal plane to either open or close the valve, the spring means 30 causes the handle 19 to assume its initial position illustrated in FIG. 1 of the drawings. This will cause the pawl 59 to re-engage with the next adjacent circumferentially spaced projection 58, such as that illustrated at 68 in FIG. 6 of the drawings. Thus, the lubricator 20 will be in a position so as to initially supply a charge of lubricant to the passage 9 of the valve stem 8 before the valve is next operated.

It will be further noted that the closure member 39 is longer than the threaded area 41 on the tubular member 28, so that after the device 15 has been actuated a number of times, the lubricant will be substantially dissipated from the reservoir 45. At this time the end 69 of the closure member 39 will abut the side 36 of the body 16. This locks the handle 19 against movement from the position shown in FIG. 1, which warns the operator of the device that additional lubricant must be provided to the mechanism. The FIG. 7 modification is substantially identical to that previously described with regard to FIGS. 1–6 inclusive, but it will be noted that the handle is adapted to be removably engaged with the body 16. To this end, a means 70 is provided which is similar in construction to the inner end 24 of the handle as previously described, which member 70 is provided with an opening 71 for receiving a pipe or other suitable means as illustrated at 72 for serving as the handle. The construction and operation of the form of the invention illustrated in FIG. 7 is otherwise similar to that previously described with regard to FIGS. 1–6 inclusive.

In FIGS. 8, 9 and 10, an alternate form of lubricator 20' is illustrated. As shown in FIG. 8, the body 16 is mounted by means of the bolts 18 which extend through the body 16 on the upper end 17 of the valve stem 8. The valve stem 8 is provided with an opening 9 therethrough as previously described with regard to FIG. 1, which opening 9 terminates at the upper end 17 of the valve stem 8. As more clearly illustrated in FIG. 10 of the drawings, a member 28' is illustrated as being engaged in the upper end of the opening 9 in the valve stem 8. This member 28' takes the place of the elongated member 28 in the FIGS. 1–6 modification. Of course, the handle 19 is pivotally supported on the body 16 by means of a member 28" which extends between the projections 21 and 22 depending from the body 16. The pin 28" extends through each of the projections 21 and 22, as well as through the projections 26 and 27 which are similar in construction to the projections 21, 22, 26 and 27 described with regard to the FIGS. 1–6 modification. However, the member 28" does not extend sidewardly of the body 16 as does the member 28 in the FIG. 1 modification, because a different form of lubricator is utilized.

The member 28' as shown in FIG. 10 is threaded throughout its length and is provided with an opening 50' extending therethrough. A closure member 39' is provided with threads 40' and engages the threads 41' of the member 28'. The end 43' of the member 28' in cooperation with the closure member 39' defines a reservoir 45' for lubricant. Projections 58' are circumferentially spaced on the outer surface of the member 39' and are adapted to be engaged by the pawl 59', which pawl 59' is carried by the annular member 80 which surrounds the closure member 39'. A ledge 81 on the lower end of the closure member 39' supports the annular member 80 in position on the closure member 39' as shown in FIG. 10 of the drawings. The pawl 59' is urged to engaging position with the ratchet wheel formed by the projections 58' on the outer surface of the member 39' by means of the spring 62' which abuts the inner end of the pawl. A pin 61' retains the pawl 59' in position in the annular support member 80. A projection 82 extends from the annular support member 80 and is engaged at its outer end 83 with a lever 84, which lever 84 is pivotally connected as illustrated at 85 to the handle 19.

In the FIGS. 8–10 inclusive modification, the handle 19 is normally maintained at a right angular relationship relative to the body 16 by means of the spring 30', which spring is similar in function and operation as the spring 30 in the FIGS. 1–7 modification. As the handle 19 is moved from the position shown in FIG. 8 to the dotted line position illustrated at 86, the lever 84 moves the annular support member 80 and the pawl 59', as well as the closure member 39' about the elongated member 28'. This reduces the size of the reservoir 45' and thereby forces lubricant from the reservoir into the passage 9 in the valve stem 8. After the valve has been operated by rotating stem 8, the handle 19 will assume its initial position as illustrated in FIG. 8, and this in turn causes the lever 84, as well as the pawl 59' to move back to its original position so that it can engage the next circumferentially spaced projection 58' on the member 39'. In this form of the invention, the number of projections 58' may vary from that in the FIGS. 1–7 modification.

It will be noted that stops 31' are provided on the lower or inner end of the handle in order to support the handle 19 in a right angle relationship relative to the body 16.

In the FIG. 11 modification, the body 16' is provided which is shaped to fit the top of the valve stem and may be held thereon as previously described, if desired. The handle 19 is eliminated in this form of the invention. A projection 100 extends from the body 16' and is engaged with the piston rod 101 which extends into the power cylinder 102. As the piston rod 101 is reciprocated, the projection 100 causes the body 16' to turn to thereby operate the valve by turning the valve stem which opens or closes the valve 2; however, before the valve is operated, power fluid from the power cylinder 102 will be first conducted through the line 103 to act on the spring loaded piston 104 to move the piston rod 105 and projection 106 engaged therewith. When this occurs, the pawl 59' which is supported in the annular member 80 in a manner similar to that described with regard to the FIGS. 8–10 modification engages the projections 58' on the closure member 39' so as to effect rotation of the closure member 39' to force lubricant from the reservoir 45' into the passage 50' of the member 28' and thence to the opening 9 in the valve stem 8. In other words, the construction of the lubricator shown in the FIG. 11 modification is similar to that form designated at 20' in the FIGS. 8–10 modification. The power fluid from cylinder 102 acts to first move the spring loaded piston 104 and extension 106 on member 80 prior to the time that piston rod 101 effects movement of the extension 100 of the body 16. This is accomplished by reason of the projection 110 being spaced on piston rod 101 so that the piston rod 101 will move a slight distance before engaging the end 111 of projection 100. This permits the power fluid on the exhaust side of piston 112 in power cylinder 102 to be first conducted through line 103 to act on the piston 104 which is smaller in size than the piston 112. The smaller piston 104 causes a greater pressure per unit area to be applied thereagainst and also, the arrangement of the spacing of the projection 110 on piston rod 101 thereby effects movement of the piston rod 105 and projection 106 so as to operate the lubricator 20' prior to the time that projection 110 engages the end 111 of extension 100 on body 16' to operate the valve. Thus, the lubricator 20' in the FIG. 11 modification is always actuated prior to the time that the valve is actuated.

It will be further noted that a spring 62' is provided for returning the annular member 80 and the pawl 59' to its original position after the valve has been actuated, and after the pressure has been released from power cylinder 102.

When pressure fluid is introduced into power cylinder 102 through the line 115 to move the valve in an opposite direction, this power fluid will become active in the line 103 to first move the spring loaded piston 104 to thereby actuate the lubricator 20', whereupon the projection 116 will engage the extension 100 of body 16 so as to rotate the valve stem to operate the valve.

From the foregoing description it can be appreciated that the present invention provides a mechanism which always lubricates a device before actuation thereof, and always lubricates with a predetermined or uniform quantity of lubricant. In all forms of the invention, the length of the closure member relative to the elongated member on which it is mounted is such that the elongated member will abut an adjacent surface so as to lock the operating mechanism against further operation of the device, until additional lubricant has been provided therefor.

For example, in the FIGS. 1–6 modification, the closure member 39 will abut against the side 36 of the body 16. In the FIGS. 8–11 modification, the closure member will gradually move down towards the top of the valve stem and will abut the top surface thereof when all of the lubricant has been utilized from the reservoir 45'. This will serve to lock the handle 19 in its upright position and will require that additional lubricant be provided to the reservoir 45', and that the closure member 39' be repositioned on the member 28' before the device can be further used.

Of course, the modification shown in FIGS. 1–7 also requires that the closure member 39 be repositioned relative to the member 28 when lubricant is to be discharged into the reservoir 45.

Broadly the invention relates to a relatively simple mechanism for lubricating and actuating a device, and lubricating and actuating the device in a desired or particular sequence. The invention has been described as it applies particularly to a plug valve, however, it may be used in any situation where similar results are desired.

What is claimed is:

1. A device adapted to be carried by a valve stem for actuation and lubrication of a valve comprising, a body fixed on the valve stem for imparting rotation thereto, a handle, means pivotally supporting said handle on said body, said pivot means including spring means for normally maintaining said handle at a substantially right angle relative to said body, but accommodating swinging movement of said handle whereby said handle may be moved to a position substantially in alignment with said body and thereby used to manually rotate said body to operate the valve stem, a closure means threadedly carried on a member extending from said body and defining a lubricant reservoir between said closure and member, passage means connecting said reservoir with the valve stem for supplying lubricant to the valve stem, and means associated with said handle and closure and member to effect movement of lubricant from said reservoir to the valve stem as said handle is moved to a position to rotate said body.

2. The device recited in claim 1, wherein said last named means includes a connection between said handle and said closure, said closure having projections on the outer surface thereof defining a ratchet wheel, and a spring loaded pawl carried by said connection and engaging said ratchet wheel so that movement of said handle to a position to rotate said body causes said pawl to rotate said closure along said member to reduce the size of said reservoir whereupon lubricant is forced from said reservoir to the valve stem.

3. An actuator and lubricator adapted to be mounted on a valve or like device to operate and lubricate the device including, a body mounted on a valve stem for imparting rotation thereto, means pivotally mounted on said body and adapted to rotate said body, spring means associated with said pivotally mounted means and normally maintaining said pivotally mounted means at substantially a right angle relative to said body, but accommodating swinging movement of said pivotally mounted means whereby said pivotally mounted means may be aligned with said body to rotate said body to thereupon operate the valve stem, a closure member threadedly carried on a member extending from said body and defining a lubricant reservoir between said closure and member, means connecting said reservoir with the valve stem on which said body is mounted, and means associated with said closure and member to effect movement of lubricant from said reservoir to the valve stem as said pivotally mounted means is moved to a position to rotate said body.

4. The structure recited in claim 3 wherein said last named means includes a connection between said pivotally mounted means and said closure, said closure having projections on the outer surface thereof defining a ratchet wheel, and a spring loaded pawl carried by said connection and engaging said ratchet wheel so that movement of said pivotally mounted means to a position to rotate said body causes said pawl to rotate said closure along said member to reduce the size of said reservoir whereupon lubricant is forced from said reservoir to the valve stem.

5. A device adapted to be carried by a valve stem for actuation and lubrication of a valve comprising a wrench having a body adapted to engage a valve stem to rotate it to actuate the valve and a handle whereby said body may be rotated, means pivotally supporting said handle on said body, said means including a spring to normally maintain said handle in right angle relationship relative to said body but accommodating swinging movement of said handle whereby said handle may be moved to a position substantially in alignment with said body and thereby used to rotate said body, an elongated member extending from the side of said body and having its exterior surface threaded, an elongated closure member threadedly engaged on said member and in cooperation with said member defining a lubricant reservoir, a passage extending longitudinally of said member, a hollow tube connecting the end of said passage with the valve stem whereby lubricant may be conducted from the reservoir to the valve stem, said closure member having circumferentially spaced projections on its exterior defining a ratchet wheel, a projection on said handle extending outwardly therefrom in the same direction as said threaded elongated member extends from said body, a spring loaded pawl carried in said handle projection and adapted to engage said projections on said closure whereby movement of said handle from its normal position to a position in substantial alignment with said body to rotate said body causes said pawl and ratchet wheel to rotate together whereupon said closure member moves along said member to reduce the volume of said reservoir which in turn forces lubricant from said reservoir through said member and tube to the valve stem.

6. The combination recited in claim 5, wherein said spring means acts, when said handle is released, to return said handle to its normal right angle relationship relative to said body, and said pawl moves relative to said ratchet wheel to engage the next circumferentially spaced projection on said wheel whereby the valve stem is always first lubricated before actuation when said handle is moved to a position to rotate said body.

7. The combination recited in claim 5, wherein said elongated member is threaded from its end to the side of said body and wherein said closure member is longer than said threaded member so that said closure member will engage the side of said body at the end of its travel and thereby lock said handle against further movement relative to said body until said closure member has been repositioned on said elongated member.

8. The combination recited in claim 5, wherein said pivotally supporting means includes a socket and said handle is adapted to be removably positioned therein.

References Cited in the file of this patent

UNITED STATES PATENTS

| | | |
|---|---|---|
| 2,055,449 | Beckwith | Sept. 22, 1936 |
| 2,073,541 | Trott | Mar. 9, 1937 |
| 2,086,946 | Rick | July 13, 1937 |
| 2,169,525 | Goldberg | Aug. 15, 1939 |
| 2,323,421 | Reed | July 6, 1943 |